United States Patent [19]

McBrady et al.

[11] Patent Number: 4,854,441

[45] Date of Patent: Aug. 8, 1989

[54] BOTTLE DUSTER

[75] Inventors: William J. McBrady, 2902 Bob-O-Link Rd., Flossmoor, Ill. 60422; Julian P. Avelis, Crete, Ill.

[73] Assignee: William J. McBrady, Flossmoor, Ill.

[21] Appl. No.: 83,451

[22] Filed: Oct. 13, 1987

Related U.S. Application Data

[60] Division of Ser. No. 792,518, Oct. 29, 1985, Pat. No. 4,701,973, which is a continuation-in-part of Ser. No. 644,240, Aug. 27, 1984, abandoned.

[51] Int. Cl.[4] .......... B65G 47/24

[52] U.S. Cl. .......... 198/384; 198/394; 198/415; 15/63; 15/306 B; 15/308

[58] Field of Search .......... 198/384, 394, 415, 416, 198/480.1, 481.1, 483.1; 15/63, 306 B, 308

[56] References Cited

U.S. PATENT DOCUMENTS

| | | | |
|---|---|---|---|
| 1,551,331 | 8/1925 | Risser | 198/480.1 |
| 2,722,657 | 3/1973 | Kienle et al. | 198/394 |
| 2,911,089 | 11/1959 | Carter | 198/394 |
| 4,428,474 | 1/1984 | Gau et al. | 198/394 |
| 4,624,098 | 11/1986 | Trendel | 198/480.1 |
| 4,682,683 | 7/1987 | Ackley et al. | 198/384 |

*Primary Examiner*—Joseph E. Valenza
*Attorney, Agent, or Firm*—Eugene F. Friedman

[57] ABSTRACT

A device for removing dust and other fine particulate matter from the exterior surface of a bottle moving along a conveyor line. A jet of ionized air neutralizes any static charge adhering the particulate matter to the bottle and also commences the dislodgement of the former from the latter. Moving brushes contacting the exterior surface of the bottle further dislodges the particulate matter. Lastly, a vacuum on the other side of the brushes from the bottle removes the air and entrained particulate matter detached from the bottles. A star wheel having indentations in it moves the bottles along at a predetermined pace. Alternately, one or more rotating longitudinal screws can control the bottles motion through the system. A belt in contact with the bottles and moving relative to the conveyor effects their rotation regardless of their exterior configuration. This assures that the brushes contact all portions of their exterior surface. The star wheel has rollers attached to it which maintain the belt in an extended configuration and keeps it in intimate contact with the bottles. When the device utilizes a longitudinal screw, the belt can rotate around rollers placed at the ends of the screw.

6 Claims, 4 Drawing Sheets

BOTTLE DUSTER

REFERENCE TO RELATED APPLICATION

The present application is a division of U.S. patent application Ser. No. 792,518, filed on Oct. 29, 1985, U.S. Pat. No. 4,701,973, which was a continuation-in-part of U.S. patent application Ser. No. 644,240, filed Aug. 27, 1984, and now abandoned.

BACKGROUND

Often bottles, in the manufacturing process, require the removal of particulate matter from their exterior surfaces. The bottles may acquire the material in the form of dust from storage. Much more frequently, the bottles acquire the coating during processing and manufacturing. For example, where the bottles contain a particulate matter, some of their contents, during the filling operation, may become attached to the exterior surfaces.

A slight powdery film on a bottle's exterior may not represent a detriment to its contents. However, a purchaser may not aesthetically appreciate the coating and, thus, decide not to purchase the product. Thus, prior to its purchase, the bottle's exterior must undergo a cleaning. This becomes particularly important when placing the bottles in a carton. A single bottle with exterior particulate matter may cause the remaining bottles to become similarly coated and undesirable.

Various types of processes have attempted to clean bottles of differing superficial contaminants. In particular, U.S. Pat. Nos. 2,516,998 to W. D. Kimball et al., 2,573,169 to C. L. Gerlach et al., 4,013,497 to W. D. Wolf, and 4,325,775 to H. Moeller show equipment that will remove labels from the exterior of bottles. These do not show how to remove fine particulate matter which may adhere with a charge of static electricity.

Furthermore, in the first, third, and fourth of the patents mentioned above, a chain or pad makes contact with the bottle's side. Moving faster than the remainder of the conveyor, the chain or pad causes the bottles to rotate about their longitudinal axis. This technique suffices to present the entire circumference of axially symmetric bottles to the delabeling equipment. However, for bottles having a cross-section not forming a circle, and, in particular, rectangular bottles, this equipment lacks the capability of rotating the object 360°. Thus, it will not present the bottle's entire exterior surface to the operational portion of the apparatus.

The patent to Gerlach et al. places bottles in pockets and rests them on bars which reciprocate. The bars, moving along the edge of the bottle, effect their rotation. Again, the question arises as to whether this arrangement has the capability of regularly rotating noncircular bottles.

Accordingly, the search continues for equipment that can remove fine particulate matter from the surface of bottles in an assembly line. In particular, the equipment should have the capability of operating upon bottles lacking axial symmetry.

SUMMARY

A mechanism for removing fine particulate matter from the exterior of a bottle should include first a neutralizing device which sprays ionized air on the bottle. The ionized air serves two functions. First, it neutralizes the electric charge on the bottle which retains the particulate matter on its surface. Secondly, the force of the air itself helps to dislodge the particles from the bottle's surface.

The cleaning equipment should further include a rubbing device, coupled to the neutralizer, to brush the exterior surface of the bottle. This brushing, of course, helps assure the dislodgement of particulate matter from the bottle's exterior.

Lastly, the cleaning equipment should include a vacuum device coupled to the rubbing means. This vacuum removes air from the immediate vicinity of the bottles. As a consequence, dislodged particulate matter becomes entrained in the flow of air into the vacuum and thus away from the bottle itself.

Conveniently, the opening for the vacuum may sit on the side of the brushes removed from the bottles. With this configuration, the ionized air strikes the bottles which then undergo brushing. The dislodged particulate matter from the brushes then enters the vacuum port.

Naturally, the equipment will perform more effectively if it presents all portions of the bottle's exterior to the brushes. Accomplishing this task generally requires rotating the bottle about its longitudinal axis. This problem becomes particularly important for a bottle moving through the equipment on a conveyor. To achieve this, even for bottles having a noncircular exterior cross-sectional configuration, requires first a resilient surface arranged along one side of a conveyor moving the bottle. The brushes moving against the bottle may well suffice for this resilient surface. The resiliency of the brushes or any other such surface allows corners of noncircular bottles to enter into the surface and will not prohibit the bottle's continued rotation.

Further, the rotational imparter includes a position-controlling device arranged over the conveyor. The position controller establishes the position of the bottle as it moves along the conveyor. Furthermore, it serves to urge the bottle against the resilient surface. The position controller may take the form of a "star" wheel having indentations slightly larger than the bottle. These indentations control the motion of the bottle along the conveyor and also force the bottle against the brushes.

Alternatively, the position controller can utilize an elongated screw. The spaces between the ridges on the screw should exceed the dimensions of the bottle. The ridges will regulate the movement of the bottle on the conveyor and press the bottle against the brushes.

Further, a flexible belt couples to the position controller. A portion of the belt makes contact with the bottle on the side opposite to the resilient surface.

To effectuate the turning of the bottle, a motive device couples to the belt and imparts to it a relative motion compared to the conveyor. Thus, the belt moves either faster or slower than the conveyor itself. This relative motion of the belt, pressing against the bottle, effectuates the bottle's rotation. It will accomplish this task even for bottles having a noncircular cross-sectional exterior configuration.

Where the position controller takes the form of the star wheel, the belt may sit in rollers attached to the star wheel itself. These rollers will urge the belt against the bottles but allow the belt to move faster or slower than the star wheel itself as well as the conveyor.

When the device utilizes an elongated screw as a position controller, the belt can fit within rollers suspended above the screw. The speed of the belt will remain independent from the motion of the conveyor or the screw.

The device may utilize more than one screw as a position controller. The first screw urges the bottle against a brush which cleans one side. A subsequent screw can press the bottles against a differently positioned brush to abrade another surface. This configuration does not require rotating the bottle to clean its sides.

Ideally, the equipment may have its own supporting structure and a C-shaped cross-sectional configuration. This allows its placement over a conveyor already in operation to clean bottles moved by it.

DETAILED DESCRIPTION

Figure 1:
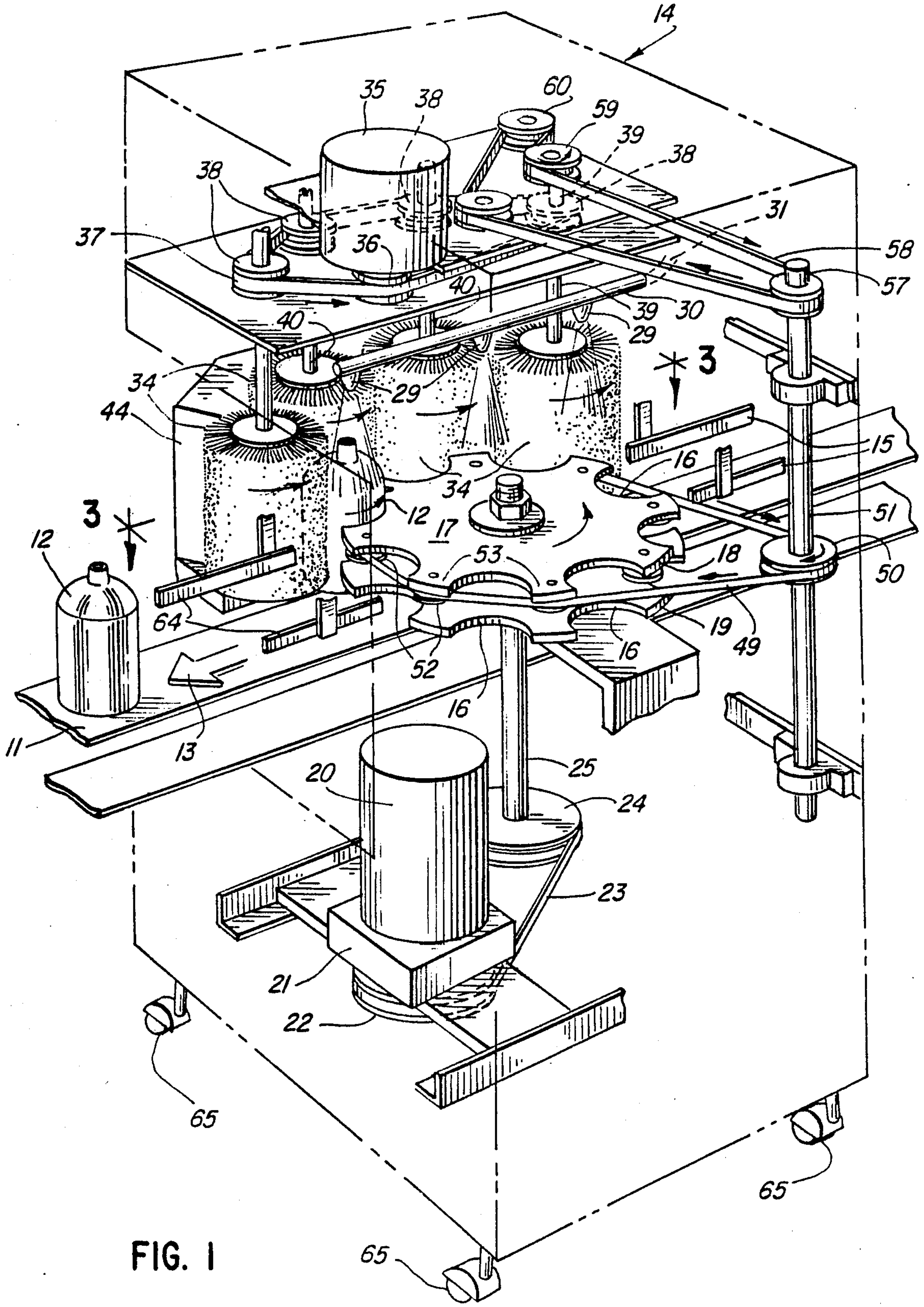
FIG. 1 gives an isometric view of equipment that can clean particulate matter from the exterior surface of a bottle.

Many types of equipment involve the use of a conveyor 11, as seen in FIG. 1, moving the bottles 12 in the direction indicated by the arrow 13. During the manufacture or assembly process, the bottles may receive a filling of a powdered material. Some of this powder may adhere to the bottle's exterior surface. Accordingly, the equipment shown generally at 14 serves to remove the particulate matter from the bottle.

As a bottle enters the cleaning equipment 14, it encounters the guides 15 which direct it to one of the openings 16 in the star wheel 17. The movement of the conveyor 11 forces the bottle firmly into one of the star wheel pockets 16.

The star wheel 17 includes the upper and lower flat segments 18 and 19, respectively. The wheel 17 then rotates in a counter-clockwise direction. As it does so, it assumes control over the motion of the bottles 12 and moves them along for their cleaning operation.

The motor 20 provides the power to turn the star wheel 17. Operating through the gear reduction box 21, the motor 20 turns the wheel 22 within which sits the belt 23. The belt 23, in turn, sits within the wheel 24 attached to the axle 25 connected to the star wheel 17. Thus, the operation of the motor 20 turns the wheel 22 which causes the belt 23 to move. This in turn rotates the wheel 24 and, thus, the axle 25 which causes the star wheel 17 to turn.

As a bottle 12 moves under the influence of the star wheel 17, it receives three separate treatments. Initially, the bottle 12 receives a spray of ionized air from the jets 29. The jets 29, in turn, connect to the manifold 30 which receives a supply of positively charged air along the conduit 31. The air in the conduit 31 receives its positive charge by passing over a high voltage probe needle such as a Simco Co., Inc., Type H nozzle powered with a Type H166 power supply.

The ionized air serves to neutralize an electrical charge sitting on the surface of the bottle which would serve to retain particulate matter on it. Also, the force of the jets of air helps to dislodge those particles at the same time.

Figure 3:
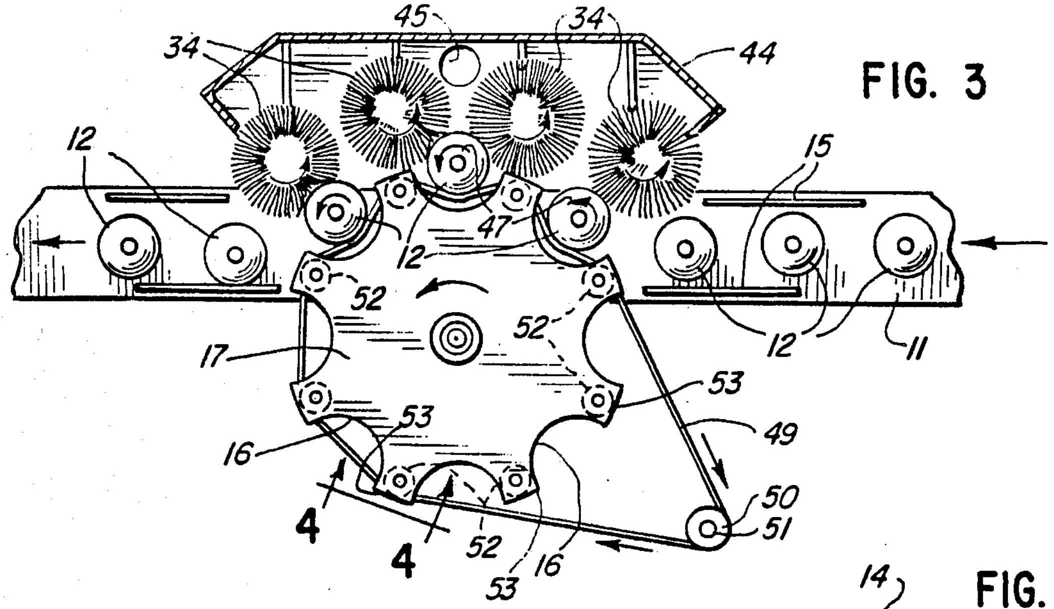
FIG. 3 gives a cross-sectional view along the line 3—3 of the bottle cleaning equipment of FIG. 1.
Figure 4:
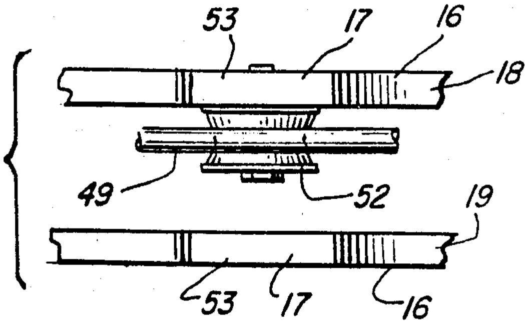
FIG. 4 gives a view along the line 4—4 of the star wheel with its attached roller supporting a belt of the equipment shown in FIG. 3.

Further, as shown particularly in FIG. 3, the star wheel 17 forces the bottles 12 into contact with the turning brushes 34. The brushes 34, by their rotation, abrade against the exterior surface of the bottles 12. They serve to dislodge and remove particles previously resting on the exterior surfaces of the bottles 12.

The operation of the motor 35 serves, eventually, to rotate the brushes 34. Specifically, the motor 35 connects to the wheel 36 within which sits the belt 37. In turn, the belt 37 fits within the wheel 38 rigidly connected to the shafts 39 and 40. The turning of the motor 35 drives the belt 37 which in turn rotates the shafts 39 and 40. These shafts connect rigidly to the brushes 34 causing them to brush the exteriors of the bottles 12.

The figures show four brushes 34. Other numbers may suffice or prove necessary for particular operations. Thus, perhaps two brushes would prove effective for simpler jobs while other circumstances may require a larger number of smaller brushes. Using brushes of carpeting, horsehair, or soft nylon bristles will effectuate the cleaning without deleteriously harming the bottles'exterior surfaces.

As seen in particular in FIG. 3, the dustpan 44 sits on the side of the brushes 34 removed from the bottles 12. The dustpan 44 catches the particles loosened by the brushes 34. The vacuum port 45 within the dustpan 44 assures the flow of air from the bottles 12 through the brushes 34 into the dustpan 44 and then into the vacuum exhaust 45. Thus, starting with the source of ionized air 29, the flow of gas goes in one direction across the bottles 12 eventually to the vacuum port 45. Any dislodged particulate matter enters this train of air and thus moves away from the bottles 12.

Lastly, the bottles should undergo some rotation as indicated by the arrows 47 in FIG. 3. For perfectly round bottles, the turning of the brushes 34 by themselves may suffice to effectuate some rotation of the bottles, although in the clockwise direction as seen in FIG. 3. However, for bottles not having a circular exterior configuration, a supplementary means of revolving them may prove necessary. The flexible belt 49, seen in FIGS. 1 and 3 to 5, accomplishes that task. As seen, in particular, in FIGS. 3 and 5, the belt 49 moves in a generally clockwise direction. In particular, the belt 49 has a component of motion relative to the conveyor 11; in other words, it moves with a component of speed different than the conveyor speed. Its resilient surface makes contact with the bottles 12.

As the belt 49 moves, its contact against the surface of the bottles 12 causes the latter to rotate. A thin belt having at least a slightly tacky surface, such as rubber, will effectuate the desired rotation of the bottles 12. As seen in FIG. 3, the belt 49 and the brushes 34 slightly squeeze the bottles 12 between them. This mutual pressure achieves two desired effects. First, it pushes the bottles 12 against the brushes 34 to allow the latter to operate effectively upon the bottles 12. Secondly, with the brushes pushing the bottles 12 against the belt 49, the belt makes firm contact with the bottles 12 and causes them to rotate.

The belt sits in the wheel 50 attached to the shaft 51. To keep it taut, the rollers 52 attach to the underside of the upper portion 18 of the star wheel 17. The rollers 52 freely rotate about their connections and sit in the star segments 53 between the pockets 16. Thus, the rollers 52 keep the belt 49 extended away from the pockets 16 and thus make sure that it contacts the bottles 12.

Furthermore, the freedom of revolution of each of the rollers 52 permits the motion of the belt 49 without causing or interfering with the motion of the star wheel 17 itself. As shown in FIG. 1, the belt 49, as stated above, sits on the wheel 50 attached to the shaft 51. Furthermore, the wheel 57 also attaches to the shaft 51 and has the belt 58 sitting in it. The belt 58, in turn, also sits in the wheel 59 attached to the shaft 39. As stated above, the shaft 39, connected to one of the brushes 34, rotates under the influence of the belt 37 coupled to the motor 35. Thus, as the brushes 34 turn due to the motor 35, the belt 58 also moves. This eventually causes the belt 49 to travel and rotate the bottles. The idler wheel 60 assures sufficient tension on the belt 58 to turn the shaft 51.

Figure 5:
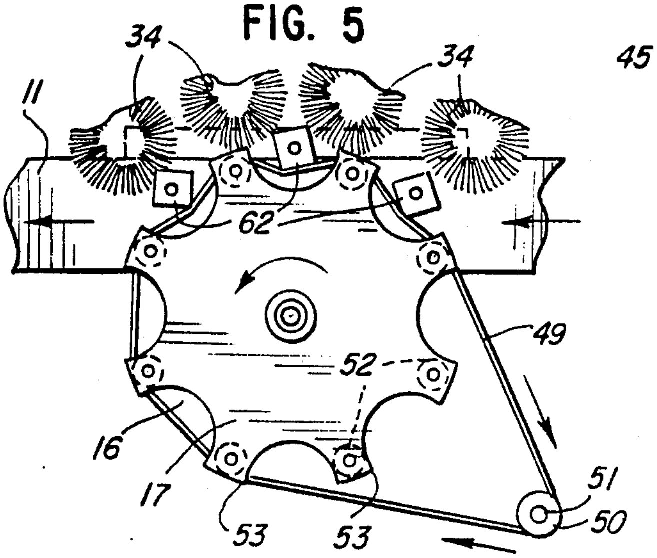
FIG. 5 shows a view similar to FIG. 3 with the belt serving to rotate bottles having a square cross-sectional exterior configuration.

As shown in FIG. 5, the belt 49 can operate properly upon square bottles 62. The mutual resiliency of the belt 49 and the brushes 34 allow the former, when in contact with any portion of the surface of the bottles 62, to cause them to rotate. Thus, bottles having a noncircular, exterior, cross-sectional configuration may undergo thorough cleaning as well.

As seen in FIG. 1, the bottle cleaner 14 also includes the guides 64 at the downstream end. These assure the correct positioning of a bottle 12 on the conveyor 11 as it leaves the cleaner 14.

Figure 2:
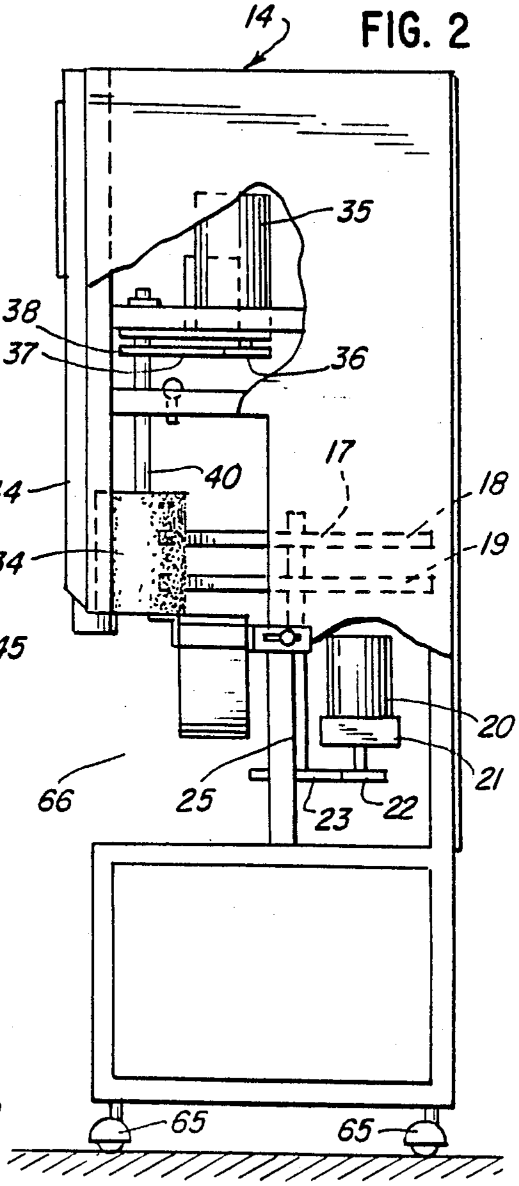
FIG. 2 gives an end elevational view, partially in cross-section, from the left of the equipment shown in FIG. 1.

The bottle cleaner 14 also sits on the casters 65 as seen in FIGS. 1 and 2. The casters 65 allow the facile movement and relocation of the bottle cleaner 14. In particular, the cleaner 14 has a C-shaped configuration with the opening of the C appearing at the front 66, or to the left in FIG. 2. The C-shaped configuration with the opening 66 allows the placement of the bottle cleaner 14 over a conveyor 11 already in place. Thus, including the bottle cleaner 14 on an assembly line otherwise already in operation, does not require special construction.

Figure 6:
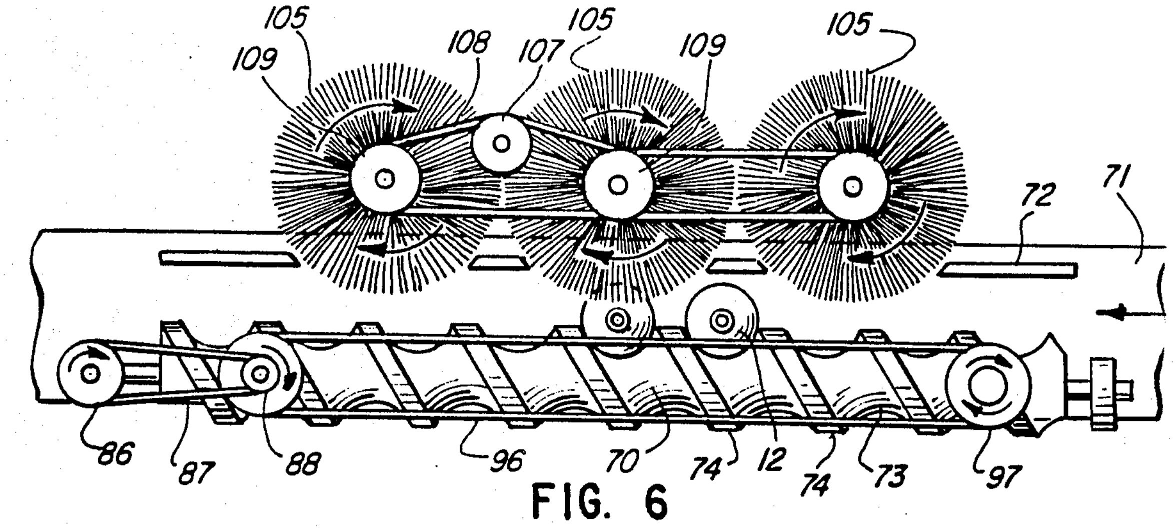
FIG. 6 gives a top plan view of the equipment utilizing an elongated screw as a position controller.

FIG. 6 shows a duster in which an elongated screw 70 controls the bottles' movement. The bottles 12 move along the conveyor 71 until the guides 72 direct them into the spaces 73 between the ridges 74 of the screw 70. The spaces 73 between the ridges 74 should exceed the width of the bottles 12.

Figure 7:
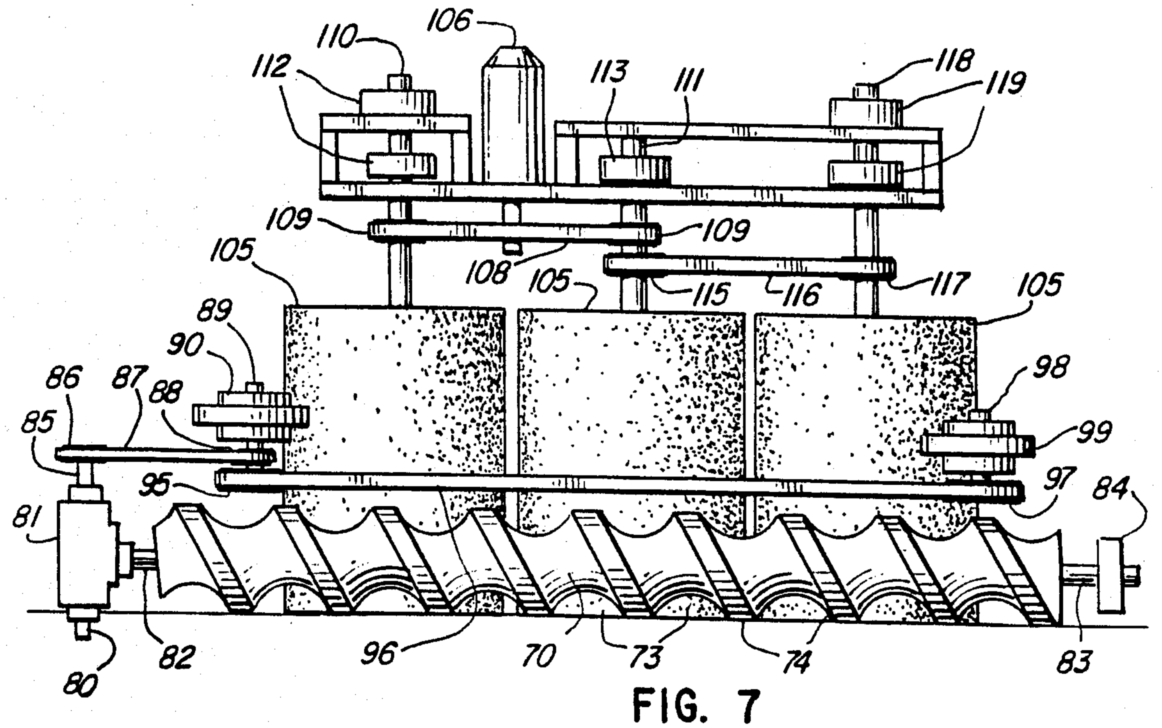
FIG. 7 gives a front view of the equipment shown in FIG. 6.

In FIG. 7, the shaft 80, attached to a motor, connects to the gear box 81. Operation of the motor rotates the shaft 80. The gear box 81 translates this rotation to the screw 70 through the spindle 82. The second spindle 83 protruding from the opposite end of the screw 70, connects to the support bearing 84.

The shaft 85 extends upward from the gear box 81 and turns in conjunction with the shaft 80. The gearing within the box 81 controls the speed at which the shaft 85 rotates. The wheel 86, attaches to the shaft 85. The belt 87, in turn, sits within the 86 on the shaft and the wheel 88 on the neighboring shaft 89 which the bearing 90 supports. The belt 87 serves to transfer the rotation of the shaft 85 to the shaft 89.

The roller 95 rigidly attaches to the shaft 89 underneath the wheel 88. The belt 96 sits within this roller 95 and extends the length of the screw 70 and around the roller 97, attached to the axle 98, supported by the bearing 99. When the shaft 89 turns, the belt 96 travels along the length of the screw 70. As the belt 96 moves, it contacts the bottles 12, causing them to rotate.

The screw 70 forces the bottles 12 into contact with the turning brushes 105. As with the duster shown in FIGS. 1 and 5, the rotating brushes 105 abrade exterior surface of the bottles 12. This serves to dislodge and remove particles to the bottles 12.

To rotate the brushes 105, the motor 106 connects to the wheel 107 within which sits the belt 108. The belt 108 also fits into the wheels 109 which rigidly attaches to the shafts 110 and 111. The bearings 112 and 113 support the shafts 110 and 111.

Subsequently, another wheel 115 rigidly attaches to the shaft 110 below the wheel 109. The belt 116 sets within the wheels 115 and 117. The wheel 117, in turn, rigidly attaches to the shaft 118 which the bearings 119 support. Accordingly, the operation of motor 106 drives the belt 108 causing the shafts 110 and 111 and thus attached brushes to rotate. The turning of the shaft 110 moves the belt 116 which then rotates the shaft 118 and its associated brush.

Figure 8:
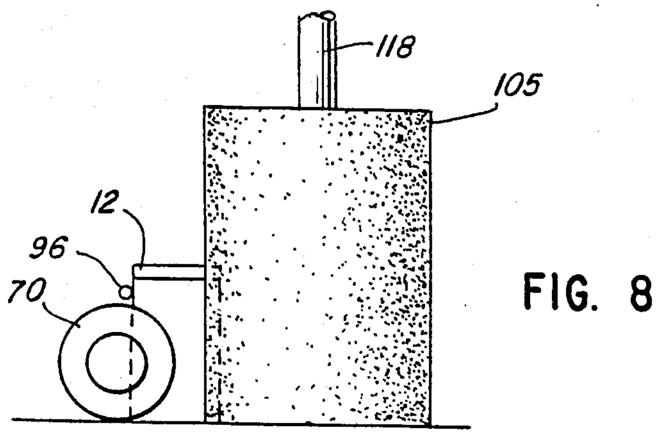
FIG. 8 shows an end elevational view from the right of the equipment shown in FIG. 7.

The duster of FIGS. 6 to 8 also utilizes jets of ionized air and a vacuum system behind the brushes. The former neutralizes charged particles, while the latter help to withdraw dust from the bottles.

Figure 9:
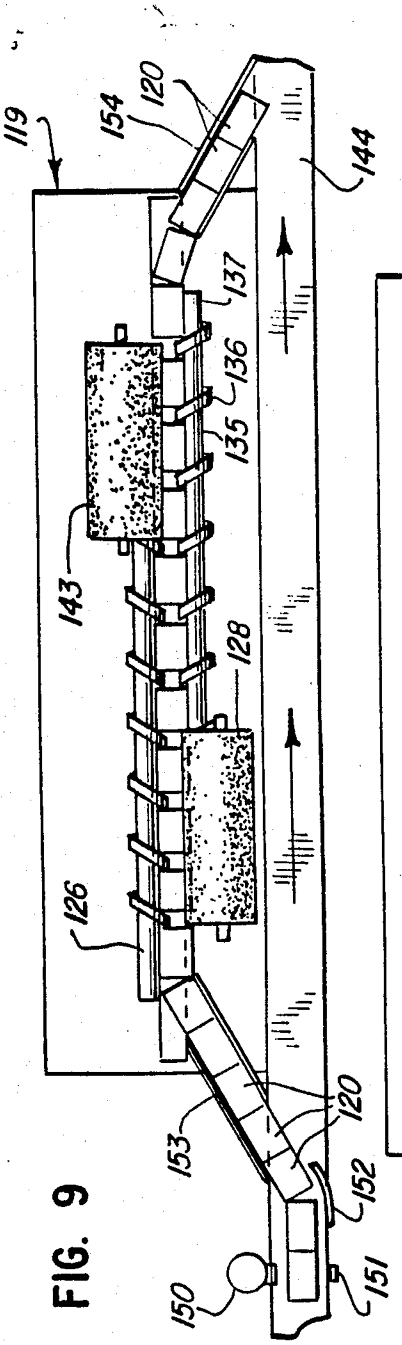
FIG. 9 shows a front elevational view of the bottle cleaning equipment utilizing a double screw mechanism to direct the bottles against multiple brushes.
Figure 11:
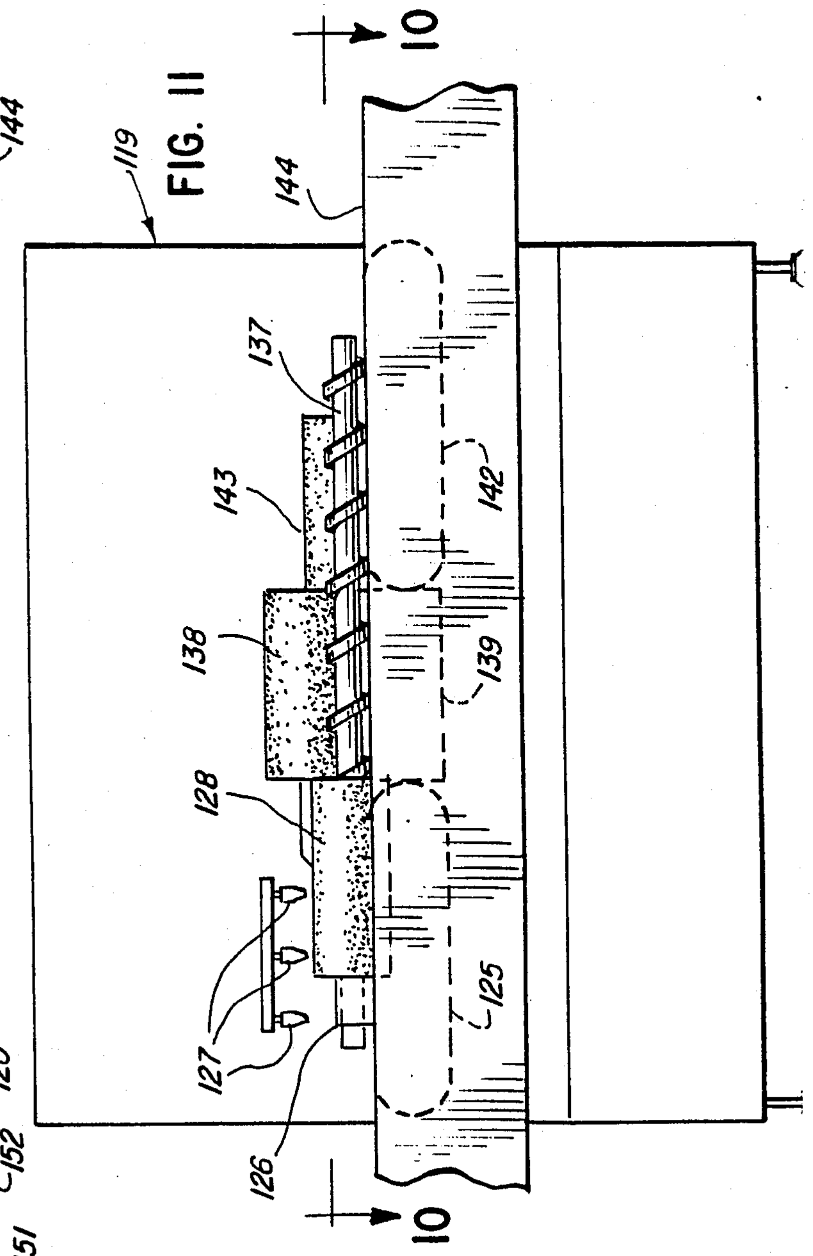
FIG. 11 gives an end elevational view, partially in cross-section, from the left of the equipment shown in FIG. 9.
Figure 10:
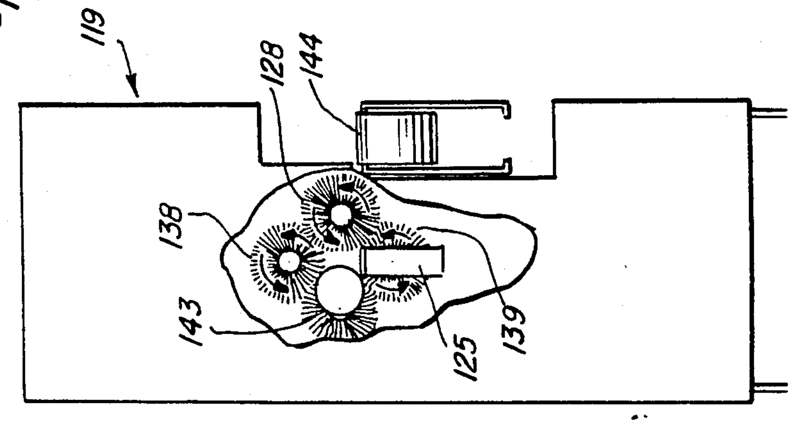
FIG. 10 gives a cross-sectional view along the line 10—10 of the bottle cleaning equipment in FIG. 9.

FIGS. 9 to 11 depict a duster generally at 119 utilizing four brushes to abrade all sides of a rectangular container 120 as it passes through the system. As shown in FIG. 9, the bottles 120 move through the system on the conveyor forming part of the dusters 119 and 125. The first screw 126 controls the position of the bottles 120, as they receive a spray of ionized air from the jets 127. The jets 127 depicted in FIG. 1 are similar in manner to those in FIG. 1 to 5.

The first screw 126 then forces the bottles 120 against the first brush 128 which abrades one of their sides. The bottle 12, while still being positioned by the first screw 126, moves into the spaces 135 between the ridges 136 of the second screw 137. The combined action of screws 126 and 137 operate to pull the bottle off of the conveyor 125 and between the top brush 138 and the bottom brush 139. By this process, the duster cleans the top and bottom of the bottles 120 simultaneously.

After emerging from the brushes, 138 and 139, the bottle 120 moves onto the duster's second conveyor belt 142. At this point, the bottle 120 passes beyond the control of screw 126 and into the control solely of the screw 137. The screw 137 then forces the bottle 120 against the fourth brush 143 which cleans the bottle's remaining side. The duster 119 also utilizes a vacuum system to remove particulate matter dislodged by the brushes 128, 138, 139, and 143. Finally, the bottle 120 passes the last brush 143 and returns to the original conveyor 144.

FIG. 10 shows the operation of the duster 119 under the control of the photocell 150 which engages the system only when the bottles 120 appear on the conveyor 144. As the bottles 120 pass the photocell 150, with its reflector 151, the detector 150 starts the duster 119. When the photocell 150 fails to sense any bottles on the conveyor 144, it shuts down the duster 119.

The guide 152 diverts the bottles 120 off the main conveyor 144 and to the chute 153. The bottles 120 transfer from the chute 153 onto the duster's conveyor 125. The screws 126 and 137 position the bottles 120 as they pass the various brushes. Finally, the bottles exit the system through the second chute 154 and return to the original conveyor 144.

Accordingly, what is claimed is:

1. A device for imparting rotational motion to a bottle moving on a conveyor comprising:

A. a resilient surface arranged along one side of said conveyor;

B. position-controlling means, arranged over said conveyor, for (1) controlling the position of said bottle as it moves on said conveyor against said resilient surface, said position-controlling means including a wheel lying in a horizontal plane and having a generally circular configuration with indentations on it slightly larger than the cross-sectional area of said bottles;

C. a flexible belt, coupled to said position-controlling means and with a portion of said belt being in contact with said bottle on the side opposite to said resilient surface, said belt extending substantially across the openings of said indentations and having sufficient flexibility to allow the entrance of said bottle into said indentation; and motive means, coupled to said belt, for imparting to said portion of said belt a motion relative to said conveyor and to said wheel.

2. The device of claim 1 wherein said portion of said belt in contact with said bottle moves in the direction opposite to the direction of motion of said conveyor.

3. The device of claim 2 wherein said belt constitutes a closed loop in a taut condition and said motive means moves said entire loop.

4. The device of claim 3 wherein said belt, in the direction of the longitudinal axis of said bottle, has a small dimension relative to the dimension of said bottle along said axis.

5. The device of claim 4 wherein said motive means includes a plurality of rollers attached to said wheel and having a freedom of revolution about an axis perpendicular to the plane of said wheel with said belt held tightly against at least one of said rollers.

6. The device of claim 5 said device is totally unattached to said conveyor and is formed in a C-shaped configuration with the opening in said C-shaped configuration being sufficiently large for said conveyor to pass through.

* * * * *